US012219437B2

(12) United States Patent
Gundavelli et al.

(10) Patent No.: US 12,219,437 B2
(45) Date of Patent: Feb. 4, 2025

(54) INTER-NETWORK SHORT MESSAGE SERVICE AMONG PRIVATE AND PUBLIC 5G NETWORKS (71) Applicant: Cisco Technology, Inc., San Jose, CA (US)

(72) Inventors: Sri Gundavelli, San Jose, CA (US); Indermeet Singh Gandhi, San Jose, CA (US); Pradeep Kumar Kathail, Los Altos, CA (US); Louis Gwyn Samuel, Gloucestershire (GB)

(73) Assignee: Cisco Technology, Inc., San Jose, CA (US)

( * ) Notice: Subject to any disclaimer, the term of this patent is extended or adjusted under 35 U.S.C. 154(b) by 763 days.

(21) Appl. No.: 17/316,205

(22) Filed: May 10, 2021

(65) Prior Publication Data
US 2022/0360953 A1 Nov. 10, 2022

(51) Int. Cl.
H04W 4/00 (2018.01)
H04W 4/14 (2009.01)
H04W 84/04 (2009.01)

(52) U.S. Cl.
CPC ............ H04W 4/14 (2013.01); H04W 84/042 (2013.01)

(58) Field of Classification Search
CPC ....... H04W 4/14; H04W 84/042; H04W 4/18; H04W 4/60
See application file for complete search history.

(56) References Cited

U.S. PATENT DOCUMENTS 6,772,210 B1    8/2004 Edholm
2005/0079882 A1 4/2005 Lee et al.
(Continued)

FOREIGN PATENT DOCUMENTS

CN    101651606    2/2010
CN    102572784    7/2012
(Continued)

OTHER PUBLICATIONS

Deutsche Telekom AG: "Proposal on New Key Issue on 3GPP System Aspects to Integrate Private Networks", 3GPP Draft, SA WG2 Meeting #114, S2-161809, 3rd Generation Partnership Project (3GPP), Mobile Competence Centre, 650, Route Des Lucioles, F-06921 Sophia, vol. SA WG2, No. Sophia Antipolis, France, Apr. 11, 2016-Apr. 15, 2016, 4 Pages, Apr. 5, 2016, XP051086771.
(Continued)

Primary Examiner — Omoniyi Obayanju
(74) Attorney, Agent, or Firm — Polsinelli P.C.

(57) ABSTRACT

Systems, methods, and computer-readable media are provided for inter-network messaging among private and public 5G networks. For instance, a first server on a public 5G mobile network can receive a first message directed to a first wireless device associated with a first network identity. The first server can determine, based on the first network identity, that the first wireless device is associated with a second network identity, wherein the second network identity is used to identify the first wireless device on a private 5G mobile network. The first server can send a copy of the first message to a second server on the private 5G mobile network for transmission to the first wireless device through the private 5G mobile network based on the second network identity.

14 Claims, 8 Drawing Sheets (56) References Cited

U.S. PATENT DOCUMENTS

2011/0010752 A1* 1/2011 Hunyady .............. H04L 63/029
370/352
2020/0314701 A1* 10/2020 Talebi Fard ...... H04W 36/0016
2022/0078698 A1* 3/2022 Geng .................... H04W 48/06

FOREIGN PATENT DOCUMENTS

| CN | 106790732 | 5/2017 |
|---|---|---|
| CN | 110896527 | 3/2020 |

OTHER PUBLICATIONS

International Preliminary Report on Patentability for International Application No. PCT/US2022/027990, mailed Nov. 23, 2023, 12 Pages.

* cited by examiner

INTER-NETWORK SHORT MESSAGE SERVICE AMONG PRIVATE AND PUBLIC 5G NETWORKS

TECHNICAL FIELD

The present technology relates generally to wireless communications, and more specifically, to providing inter-network short message service (SMS) among private and public 5G networks.

BACKGROUND

Wireless communications systems are deployed to provide various telecommunications and data services, including telephony, video, data, messaging, and broadcasts. A fifth-generation (5G) mobile standard calls for higher data transfer speeds, greater number of connections, and better coverage, among other improvements. The advantages offered by a 5G network can be leveraged by private industries that are driving the deployment of private networks, which may also be referred to as Standalone Non-public Networks (SNPNs) or Public Network Integrated Non-Public Networks (PNI-NPNs).

In some cases, a wireless device can be configured to operate on multiple wireless networks. For example, a wireless device can be configured to operate on a private network (e.g., an NPN) as well as a public network that is operated by a mobile network operator (MNO). In some examples, the wireless device may be configured to use different network identities that are associated with the different wireless networks. A wireless network can use the network identity associated with a wireless device to provide short message service (SMS) (e.g., text messages) to the wireless device.

BRIEF DESCRIPTION OF THE DRAWINGS

In order to describe the manner in which the various advantages and features of the disclosure can be obtained, a more detailed description will be rendered by reference to specific embodiments which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

Overview

Disclosed herein are systems, methods, and computer-readable media for providing inter-network short message service (SMS) among private and public 5G networks. According to at least one example, a method of messaging among wireless networks is provided. The method can include, receiving, by a first server on a public 5G mobile network, a first message directed to a first wireless device associated with a first network identity; determining, by the first server based on the first network identity, that the first wireless device is associated with a second network identity, wherein the second network identity is used to identify the first wireless device on a private 5G mobile network; and sending a copy of the first message to a second server on the private 5G mobile network for transmission to the first wireless device through the private 5G mobile network based on the second network identity.

In at least some examples relating to the method described above, the first server comprises a Short Message Service Function (SMSF) server.

In at least some aspects, the method described above can include obtaining, from a Data Network Authentication, Authorization, and Accounting (DN-AAA) server on the public 5G mobile network, an address corresponding to the second server.

In at least some examples, the method described above can include determining, by the first server, that the first wireless device is not accessible on the public 5G mobile network.

In at least some examples, the method described above can include receiving, from the second server, an indication that the copy of the first message was delivered to the first wireless device.

In at least some aspects relating to the method described above, the first message comprises a Short Messaging Service (SMS) message.

In at least some examples relating to the method described above, the copy of the first message includes an indication that the first message was directed to the first network identity.

In at least some aspects, the method described above can include receiving, from the second server, a second message directed to a second wireless device, wherein the second message includes a sender identifier corresponding to the second network identity used to identify the first wireless device on the private 5G mobile network; and sending a copy of the second message to the second wireless device, wherein the sender identifier in the copy of the second message corresponds to the first network identity.

According to at least one example, a system for providing inter-network short message service (SMS) among private and public 5G networks. The system can include one or more processors and at least one computer-readable storage medium having stored thereon instructions which, when executed by the one or more processors, cause the one or more processors to: obtain a subscription policy associated with a wireless device having a first network identity corresponding to a first network, wherein the subscription policy includes at least one messaging preference associated with a second network identity corresponding to a second network; and initiate an authentication session between the wireless device and a server on the second network, wherein the authentication session associates the first network identity with the second network identity on the server.

In at least some examples relating to the system described above, the at least one messaging preference is based on a user preference obtained from the wireless device.

In at least some aspects relating to the system described above, the first network comprises a public 5G mobile network and the second network comprises a private 5G mobile network.

In at least some examples relating to the system described above, the authentication session comprises a secondary authentication between the wireless device and a Data Network Authentication, Authorization, and Accounting (DN-AAA) server on the second network.

In at least some aspects, the system described above can receive a first message directed to the wireless device having the first network identity; and send a copy of the first message to the wireless device, wherein the copy of the first message includes an indication that the first message was directed to the first network identity.

In at least some examples relating to the system described above, the copy of the first message is sent using a Non-Access Stratum (NAS) protocol.

According to one example, a non-transitory computer-readable storage medium for providing inter-network messaging among public and private networks is provided. The non-transitory computer-readable storage medium can store instructions, which, when executed by one or more processors, cause the one or more processors to: receive, by a first server on a public 5G mobile network, a first message directed to a first wireless device associated with a first network identity; determine, by the first server based on the first network identity, that the first wireless device is associated with a second network identity, wherein the second network identity is used to identify the first wireless device on a private 5G mobile network; and send a copy of the first message to a second server on the private 5G mobile network for transmission to the first wireless device through the private 5G mobile network based on the second network identity.

In at least some aspects, the non-transitory computer-readable storage medium described above can obtain, from a Data Network Authentication, Authorization, and Accounting (DN-AAA) server on the public 5G mobile network, an address corresponding to the second server.

In at least some aspects, the non-transitory computer-readable storage medium described above can determine, by the first server, that the first wireless device is not accessible on the public 5G mobile network.

In at least some examples, the non-transitory computer-readable storage medium described above can receive, from the second server, an indication that the copy of the first message was delivered to the first wireless device.

In at least some aspects relating to the non-transitory computer-readable medium described above, the copy of the first message includes an indication that the first message was directed to the first network identity.

In at least some aspects, the non-transitory computer-readable storage medium described above can receive, from the second server, a second message directed to a second wireless device, wherein the second message includes a sender identifier corresponding to the second network identity used to identify the first wireless device on the private 5G mobile network; and send a copy of the second message to the second wireless device, wherein the sender identifier in the copy of the second message corresponds to the first network identity.

This overview is not intended to identify key or essential features of the claimed subject matter, nor is it intended to be used in isolation to determine the scope of the claimed subject matter. The subject matter should be understood by reference to appropriate portions of the entire specification of this application, any or all drawings, and each claim.

The foregoing, together with other features and embodiments, will become more apparent upon referring to the following specification, claims, and accompanying drawings.

EXAMPLE EMBODIMENTS

A wireless device can include devices such as a mobile phone, router, tablet computer, laptop computer, tracking device, wearable device (e.g., a smart watch, glasses, an XR device, etc.), Internet of Things (IoT) device, a vehicle (or a computing device of a vehicle), and/or another device used by a user to communicate over a wireless communications network. In some instances, a wireless device can be referred to as user equipment (UE), such as when referring to a wireless device configured to communicate using 5G/New Radio (NR) or other telecommunications standard.

In some cases, a wireless device be configured to operate on a private network as well as a public network (e.g., a network operated by a mobile network operator (MNO)). For example, the wireless device can have different network identities that can be used to associate with each corresponding network. Messages (e.g., SMS messages) that are directed to the wireless device using one of its network identities may be lost or delayed if the wireless device is not registered to the corresponding network. For example, if a message is sent to the network identity that the wireless device uses to associate with a private enterprise network, the message will not be delivered if the wireless device is registered to a public network (e.g., the message cannot be delivered because the device is not connected to the private network). Similarly, if a message is sent to the network identity that the wireless device uses to associate with a public network, the message will not be delivered if the wireless device is registered to a private network (e.g., the message cannot be delivered because the device is not connected to the public network).

The present technology provides systems and techniques that can be used to provide Short Message Service (SMS) messaging between private 5G wireless networks and public 5G wireless networks. In some aspects, a network identity corresponding to a wireless device on a first network can be associated with a network identity corresponding to a wireless device on a second network. In one illustrative example, a wireless device that is registered to operate on a private packetized mobile network can be configured to perform a secondary authentication (e.g., using 3GPP secondary authentication) with a public packetized mobile network that can be used to create an association between the private network identity and the public network identity.

In another illustrative example, a wireless device that is registered to operate on a public packetized mobile network can be configured to perform a secondary authentication (e.g., using 3GPP secondary authentication) with a private packetized mobile network that can be used to create an association between the public network identity and the private network identity. In some aspects, the secondary authentication is performed by a Data Network Authentication, Authorization, and Accounting (DN-AAA) server.

In some examples, a first server (e.g. a Short Message Service Function (SMSF) server) on a first network can receive a message that is directed to a wireless device associated with a first network identity. The first server can determine that the wireless device is associated with a second network identity that is used to identify the wireless device on a second network. The server can send a copy of the message to a second server on the second network. In some configurations, the first network can correspond to a public 5G mobile network and the second network can correspond to a private 5G mobile network. The copy of the message that is sent to the second network can include references to the first network identity and the second network identity. In some cases, the copy of the message can be delivered to the wireless device using Non-Access Stratum (NAS) protocol with an indication that the message was directed to the first network identity.

In some examples, the first server can determine that the first wireless device is not accessible on the first network (e.g., by attempting to page the wireless device). In some aspects, the first server can obtain the address of the second server from a Data Network Authentication, Authorization, and Accounting (DN-AAA) server on the first network. In some examples, the DN-AAA server can maintain or store the association between the first network identity and the second network identity (e.g., association based on secondary authentication between the wireless device and the DN-AAA server). In some configurations, the DN-AAA can communicate with the wireless device to perform the secondary authentication.

Figure 1A:
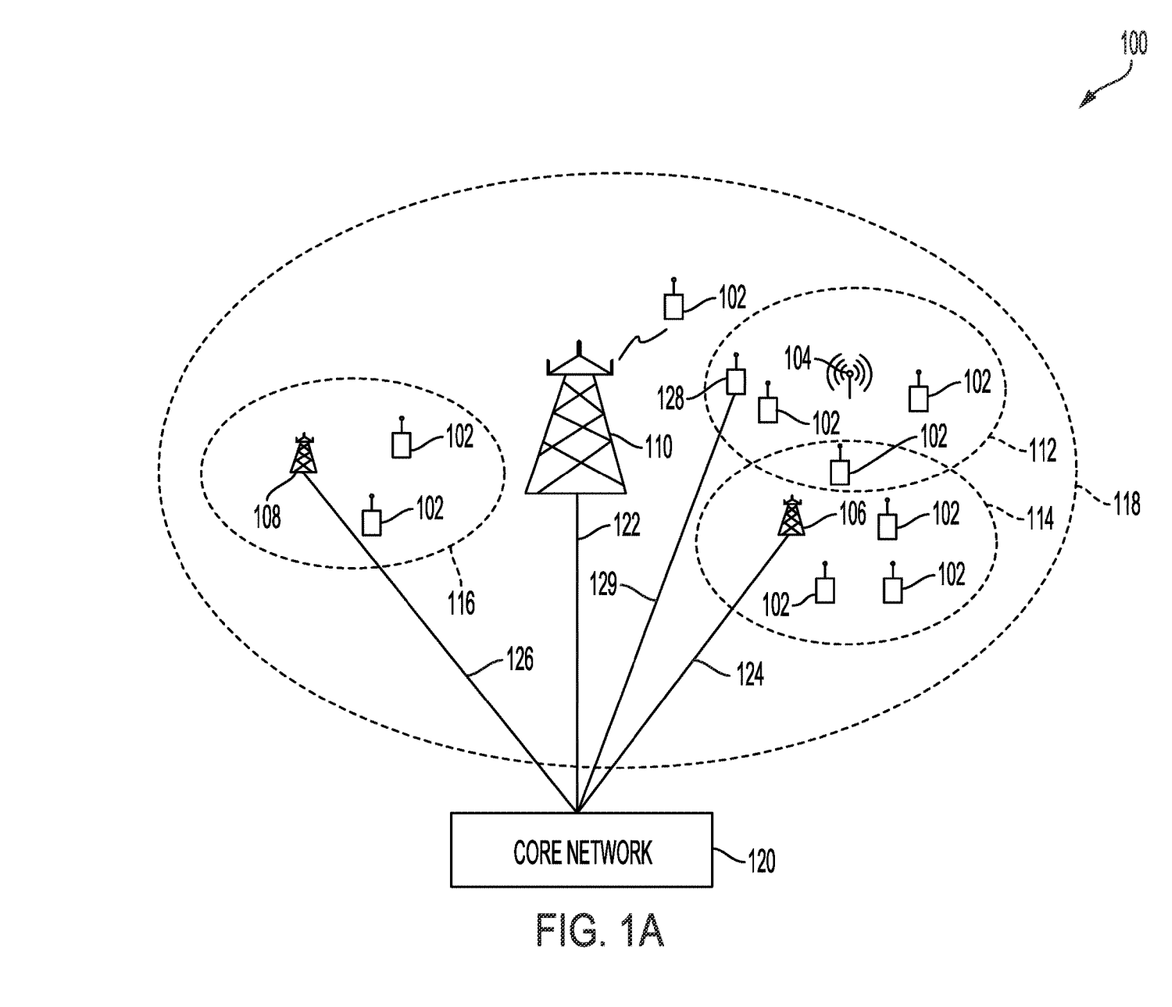
FIG. 1A is a block diagrams illustrating an example network architecture, in accordance with some examples.
Figure 1B:
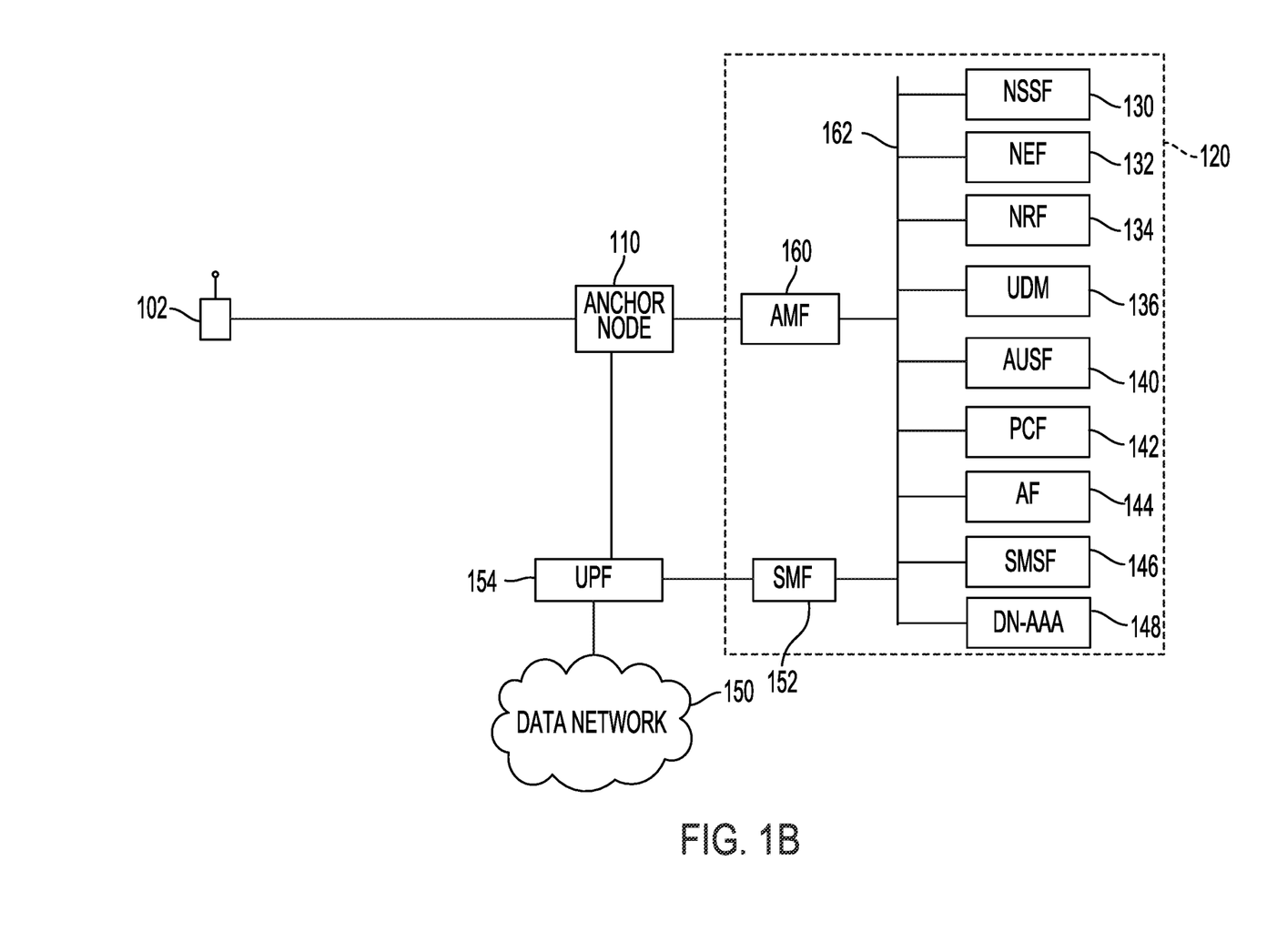
FIG. 1B is a block diagrams illustrating an example network architecture, in accordance with some examples.
Figure 2:
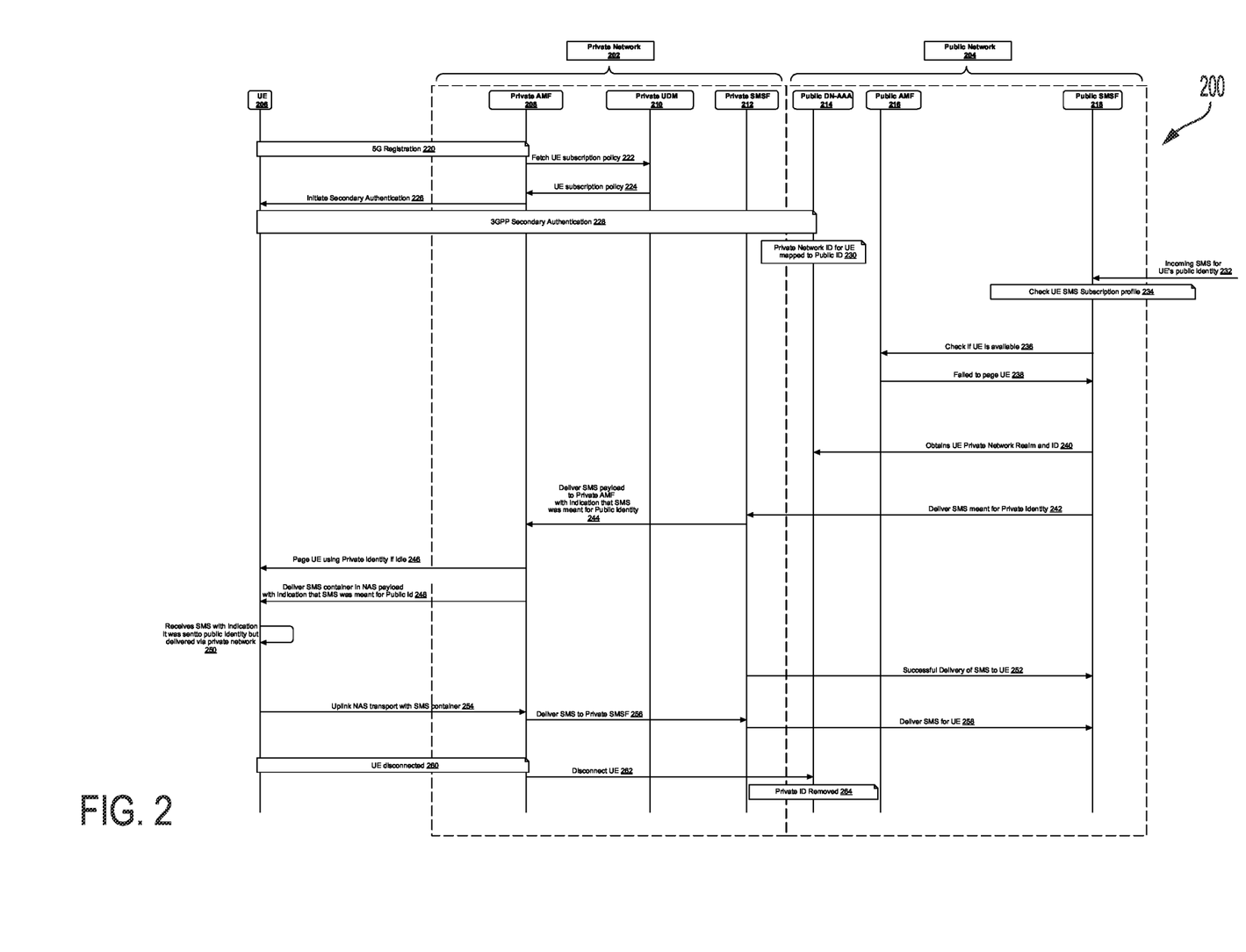
FIG. 2 is a sequence diagram illustrating an example of a process for performing inter-network messaging, in accordance with some examples.
Figure 3:
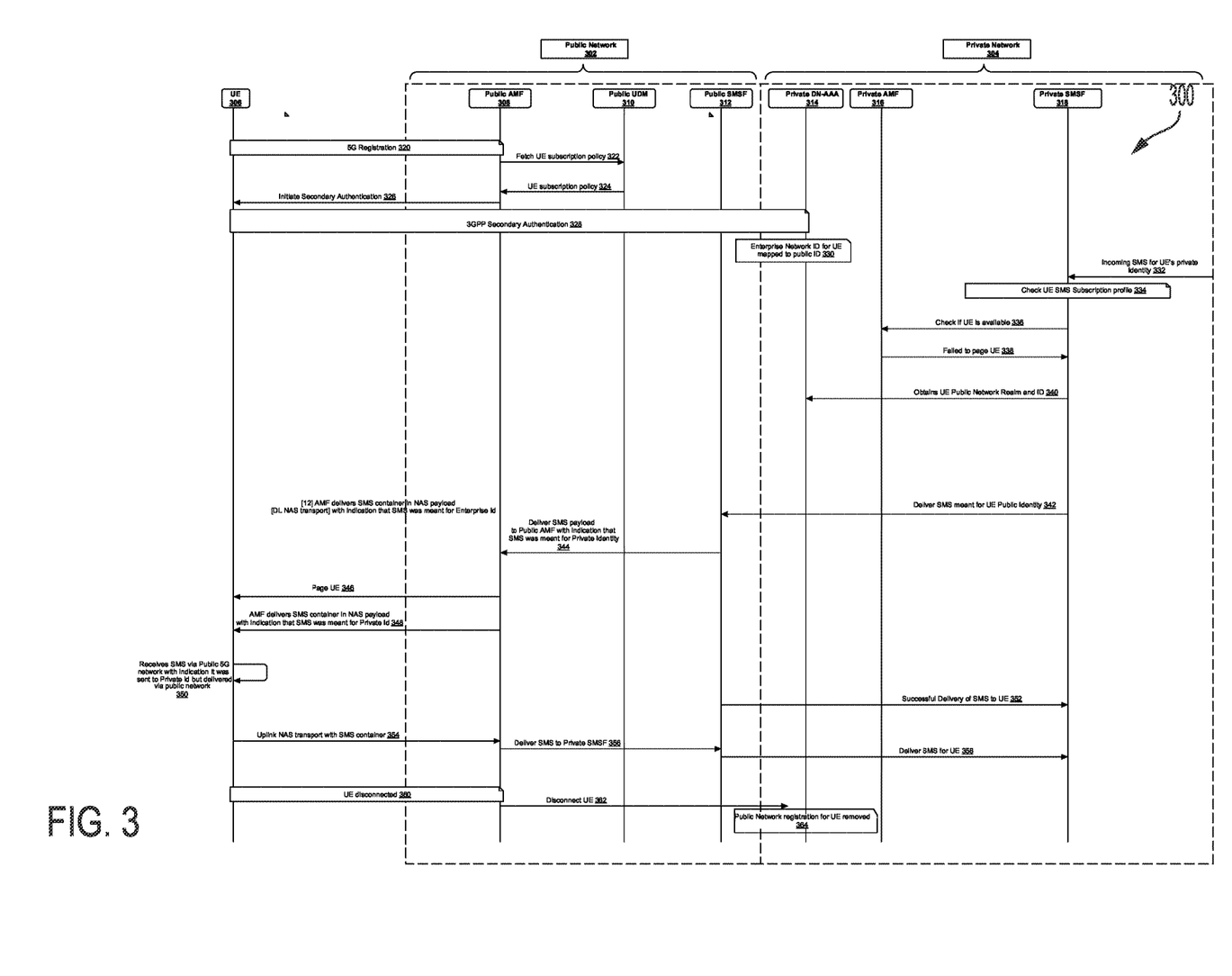
FIG. 3 is a sequence diagram illustrating another example of a process for performing inter-network messaging, in accordance with some example.
Figure 4:
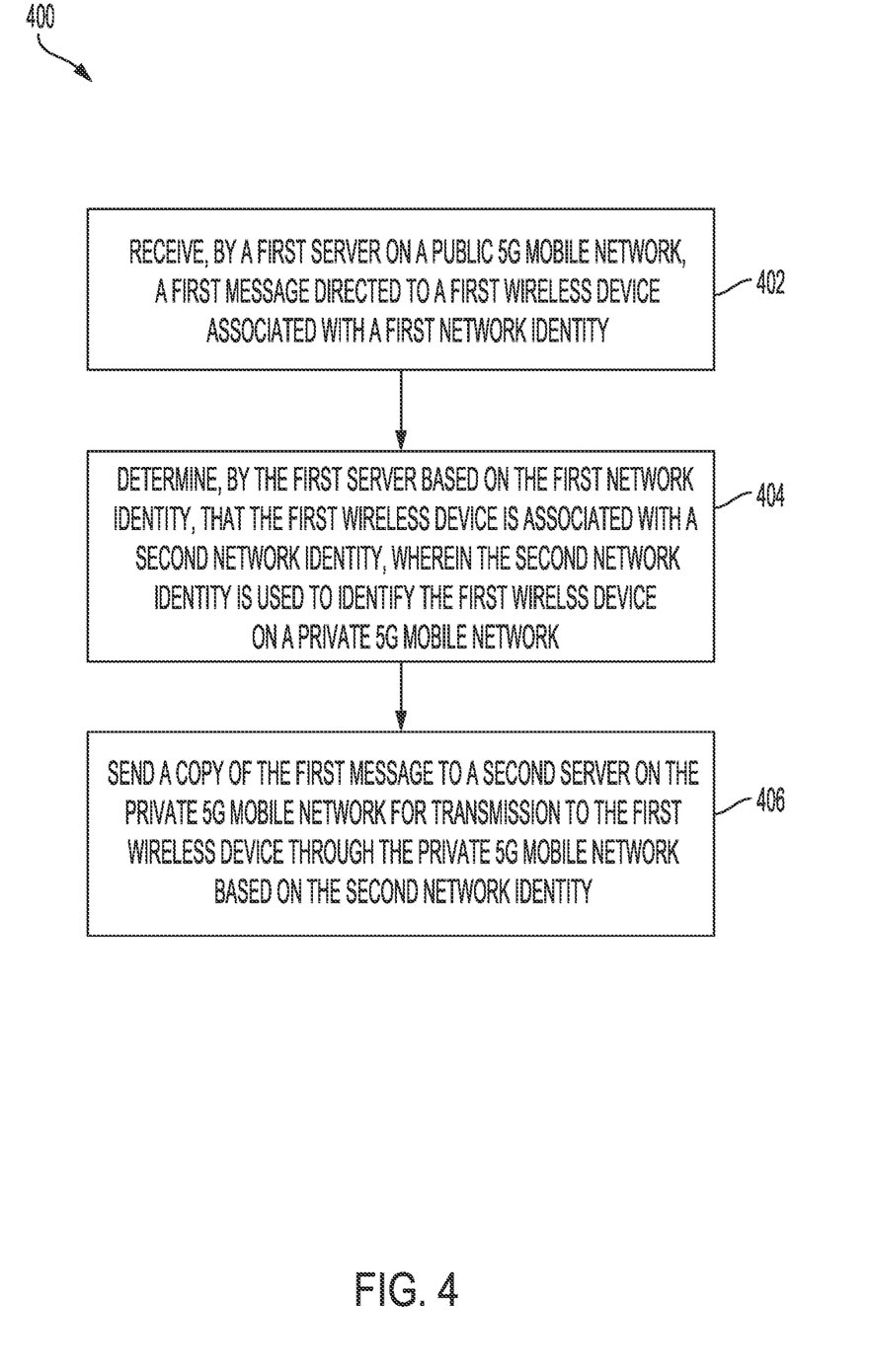
FIG. 4 is a flowchart illustrating an example method for performing inter-network messaging, in accordance with some examples.
Figure 5:
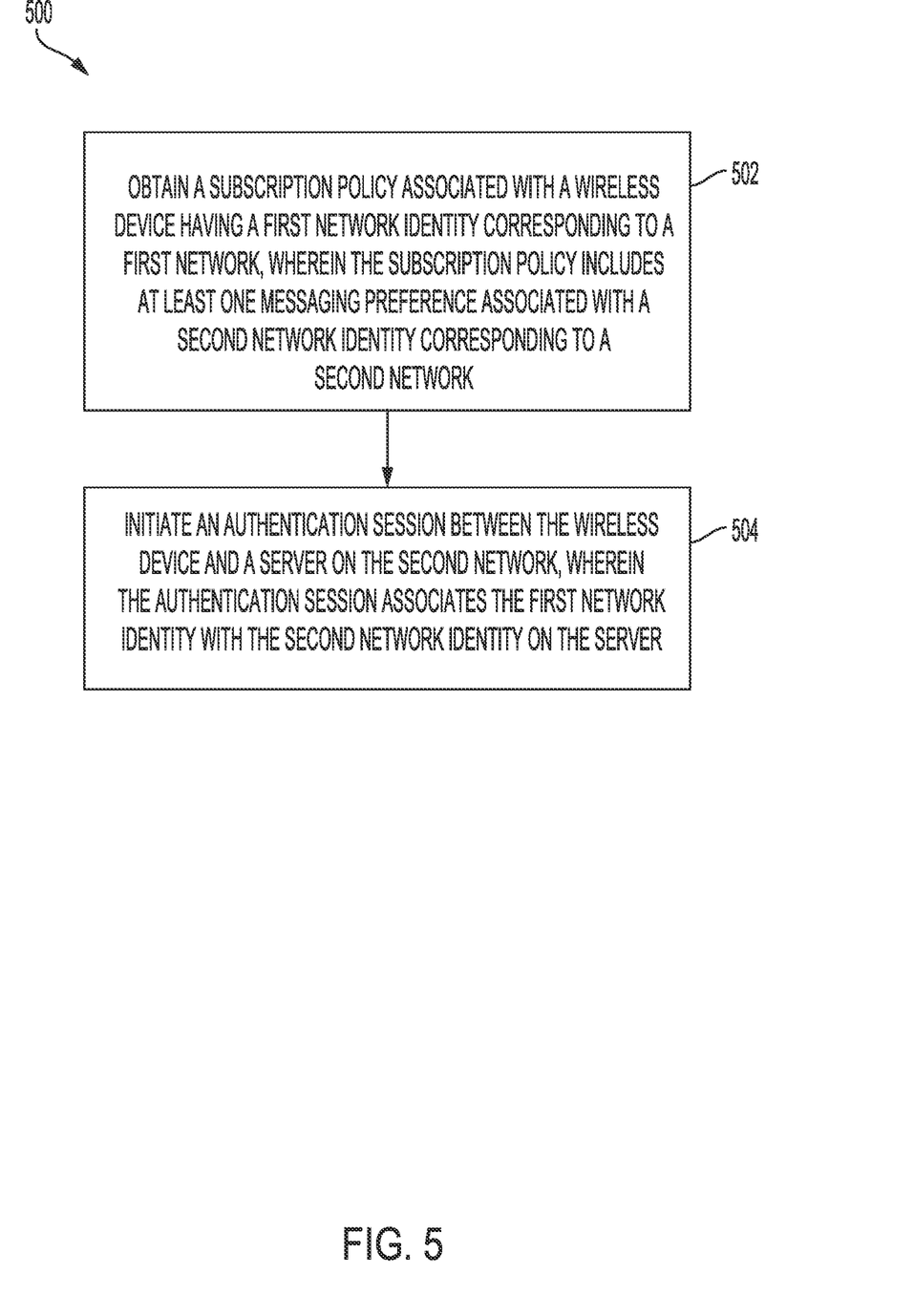
FIG. 5 is a flowchart illustrating another example method for performing inter-network messaging, in accordance with some examples.
Figure 6:
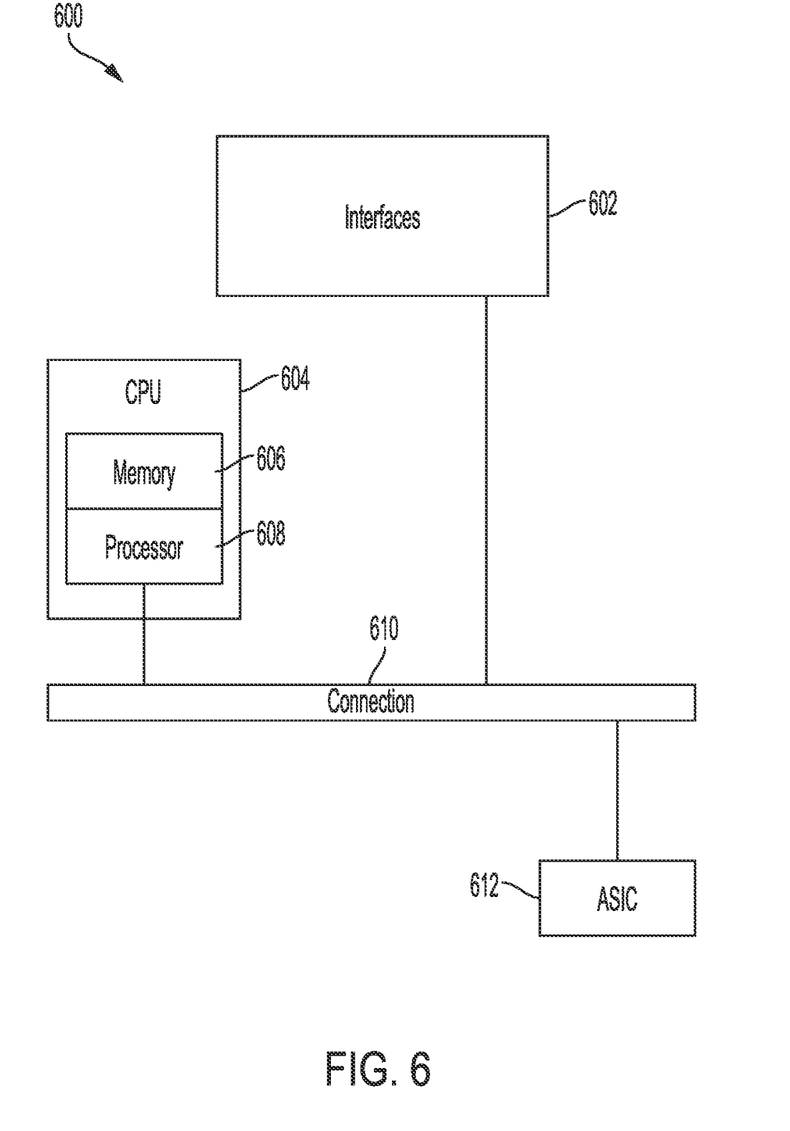
FIG. 6 illustrates an example network device in accordance with some examples.
Figure 7:
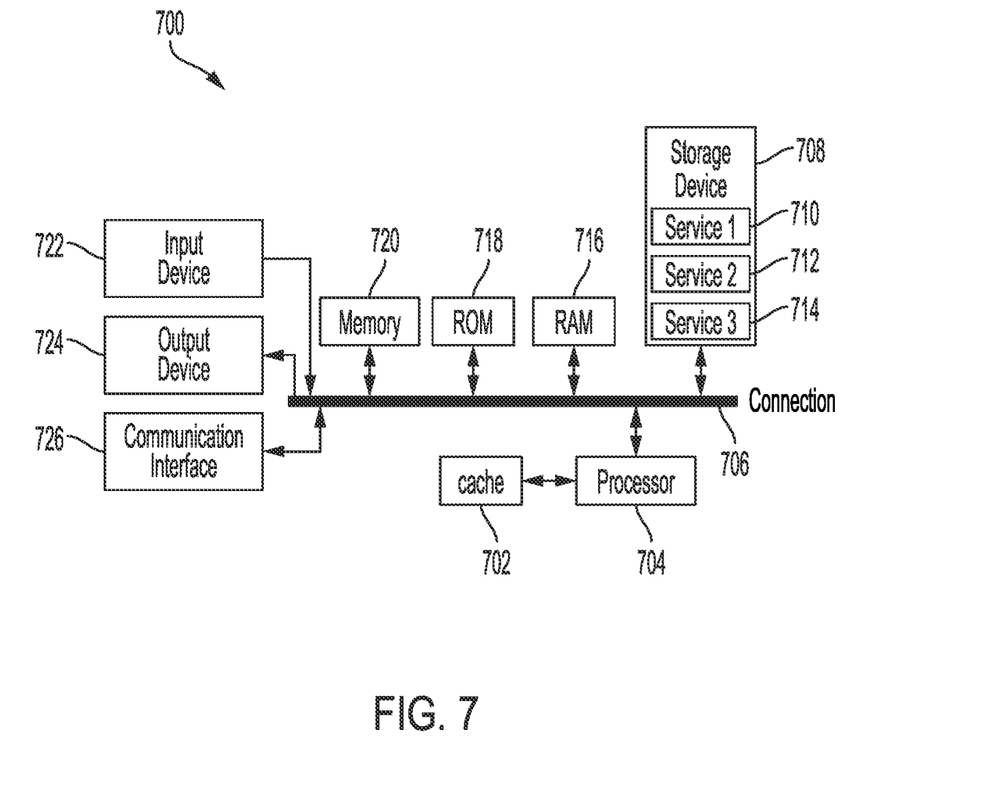
FIG. 7 illustrates an example computing device in accordance with some examples.

As further described below, the disclosed technology provides systems, methods, and computer-readable media for providing inter-network SMS messaging among public and private wireless networks. Examples will be described herein using 5G/New Radio (NR) as an illustrative example. However, the systems and techniques are not limited to 5G and can be implemented using other wireless technologies such as next generation 6G networks. The present technology will be described in the subsequent disclosure as follows. The discussion begins with a description of example wireless networks, as illustrated in FIGS. 1A-B. A description of examples sequences for inter-network messaging, as illustrated in FIGS. 2-3, will then follow. After that, a description of example methods for providing inter-network messaging, as illustrated in FIGS. 4-5, will follow. The discussion concludes with a description of an example network device, as illustrated in FIG. 6, and an example computing device, as illustrated in FIG. 7. The disclosure now turns to FIGS. 1A-B.

FIGS. 1A-B illustrate an example of network architecture and associated components, according to an aspect of the present disclosure. As shown in FIG. 1A, network 100 is a 5G wireless communication network. Network 100 can include a number of user equipment (UE) 102. UEs 102 can be any type of known or to be developed device capable of establishing communication over a wireless/radio access technology with other devices. Examples of UEs 102 include, but are not limited to, various types of known or to be developed smart phones, laptops, tablets, desktop computers, Internet of Things (IoT) devices, etc.

UEs 102 can have multiple different radio access technology (RAT) interfaces to establish a wireless communication session with one or more different types of base stations (nodes) that operate using different RATs with network 100. For example, a UE 102 can have a 5G interface as well as a 4G interface. Therefore, such UE 102 can be, from time to time and as the need may arise, be handed over from a 5G network to a neighboring 4G network and vice-versa.

Network 100 may also include nodes 104, 106, 108 and 110. Nodes 104, 106, 108 and 110 can also be referred to as base stations or access points 104, 106, 108 and 110. For example, node 104 can be a WiFi router or access point providing a small cell site or coverage area 112 for several of the UEs 102 therein. Therefore, node 104 may be referred to as a small cell node. Nodes 106 and 108 can be any one of various types of known or to be developed base stations providing one or more different types of Radio Access Networks (RANs) to devices connecting thereto. Examples of different RANs include, but are not limited to, Global System for Mobile Communication (GSM), General Packet Radio Service (GPRS)/Enhanced Data Rates for GSM Evolution (EDGE), Universal Mobile Telecommunications System (UMTS), Long-Term Evolution (LTE), LTE-advanced, Worldwide Interoperability for Microwave Access (WiMAX), WiFi, Code Division Multiple Access (CDMA), Evolution-Data Optimized (EV-DO), IS-95 etc.

Node 106 can provide coverage area 114 for end points 102 within coverage area 114. As shown in FIG. 1A, one or more UEs 102 can be located on an overlapping portion of coverage areas 112 and 114. Therefore, such one or more UEs 102 can communicate with node 104 or node 106.

Furthermore, node 108 can provide coverage area 116 for some of UEs 102 in coverage area 116. Node 110 can provide coverage area 118 for all UEs 102 shown in FIG. 1A.

Within the 5G structure of network 100, nodes 104, 106, 108 and 110 may operate in a connected manner to expand the coverage area provide by node 110 and/or to serve more UEs 102 than node 110 or some of the nodes 104, 106, 108 and 110 can handle individually. Node 104 may be communicatively coupled to node 106, which may in turn be communicatively coupled to node 110. Similarly, node 108 can be communicatively coupled to node 106 and/or node 110. Node 104 and node 106 can communicate with node 110 via any known or to be developed wireless communication standard. Also, node 108 can communicate with node 110 via any known or to be developed wireless communication standard.

Within network 100, node 110 can have a wired connection to core network 120 via, for example, fiber optics cables. This may be referred to as backhaul 122 or backhaul connection 122. While fiber optic cables are an example of a connection medium for backhaul 122, the present disclosure is not limited thereto and the wired connection can be any other type of know or to be developed wire.

Furthermore, each of nodes 106, 108 and 110 can include any type of base station such as a next generation or 5G e-NodeB, which may also be referred to a global NodeB (gNB). Each of nodes 106 and 108 can have separate backhaul connections 124 and 126 to core network 120. Connections 124 and 126 can be the same as backhaul connection 122. In an example, where node 104 is a WiFi node, node 104 can connect to Core network 122 via a node 128, which can be a N3 Interworking Function (N3IWF) node. Connection 129 between node 128 and Core network 120 can be the same as backhaul connection 122.

FIG. 1B illustrates another example architecture with components of core network 120 of FIG. 1A, according to an aspect of the present disclosure. A simplified version of network 100 is shown in FIG. 1B, where a single UE 102 has a wireless communication session established with base station 110. Base station 110 is in turn connected to core network 120 via backhaul 122.

Furthermore, FIG. 1B illustrates example logical components of core network 120. Example components/nodes of core network 120 include various network functions implemented via one or more dedicated and/or distributed servers (can be cloud based). Core network 120 of 5G network 100 can be highly flexible, modular and scalable. It can include many functions including network slicing. It offers distributed cloud-based functionalities, Network functions virtualization (NFV) and Software Defined Networking (SDN).

For example, core network 120 can include Application and Mobility Management Function (AMF) 160, with which base station 110 communicates (e.g., using an N2 interface). Core network 120 further has a bus 162 connecting various servers providing different example functionalities. For example, bus 162 can connect AMF 160 to Network Slice Selection Function (NSSF) 130, Network Exposure Function (NEF) 132, Network Repository Function (NRF) 134, Unified Data Management (UDM) 136, Authentication Server Function (AUSF) 140, Policy Control Function (PCF) 142, Application Function (AF) 144, Short Message Service Function (SMSF) 146, Data Network Authentication, Authorization, and Accounting (DN-AAA) 148 function/server, and Session Management Function (SMF) 152. In some aspects, one or more of the functions or components illustrated may be outside of core network 120 (e.g., DN-AAA 148 can be outside core network 120).

In one example, a node serving as SMF 152 may also function as a control plane Packet Gateway (PGW-C) node. Various components of core network 120, examples of which are described above, provide known or to be developed functionalities for operation of 5G networks including, but not limited to, device registration, attachment and authentication, implementing network policies, billing policies, etc.

Furthermore, as shown in FIG. 1B, SMF 152 is connected to User Plane Function (UPF) 154, which in turns connects core network 120 and/or UE 102 (after authentication and registration with core network 120) to data network (DN) 150. In one example, a node serving as UPF 154 may also function as a user plane Packet Gateway (PGW-C) node and/or a user place Serving Gateway (SGW-U) node.

While FIG. 1B illustrates an example structure and components of core network 120, the present disclosure is not limited thereto. Core network 120 can include any other number of known or to be developed logical functions and components and/or can have other known or to be developed architecture.

For purposes of illustration and discussion, network 100 has been described with reference to a limited number of UEs 102, nodes 104, 106, 108, 110, etc. However, inventive concepts are not limited thereto.

Furthermore, while certain components have been illustrated and described with reference to FIGS. 1A-B, network 100 can include any other known or to be developed elements or components for its operation.

FIG. 2 is a sequence diagram illustrating an example of a sequence 200 for performing inter-network messaging among private and public 5G wireless networks. The sequence 200 may be performed by a private network 202, a public network 204, and a UE 206. The private network 202 can include a private Application and Mobility Management Function (AMF) 208, a private Unified Data Management (UDM) 210 (e.g., authentication server), and a private Short Message Service Function (SMSF) 212. The public network 204 can include a public Data Network Authentication, Authorization, and Accounting (DN-AAA) server 214, a public AMF 216, and a public SMSF 218.

At action 220, UE 206 can perform 5G registration with private network 202 (e.g., a Non-Public Network such as an enterprise network). In some aspects, private network 202 can correspond to a private 5G/NR mobile network. In some cases, UE 206 can be associated with a network identifier that can be used to identify UE 206 on network 202. In some examples, the network identifier can correspond to an International Mobile Subscriber Identity (IMSI) which can correspond to a Subscriber Identity Module (SIM) associated with UE 206. In some aspects, the network identifier can be associated with a mobile station international subscriber directory number (MSISDN), which can provide a mapping of a telephone number associated with UE 206 to the SIM.

At action 222, private AMF 208 can request a UE subscription policy associated with UE 206 from private UDM 210. At action 224, private UDM 210 can send the UE subscription policy associated with UE 206 to private AMF 208. In some examples, the UE subscription policy can include one or more messaging preferences associated with UE 206. For instance, the UE subscription policy can include a preference for sending and/or receiving SMS messages through public network 204. In some aspects, the UE subscription policy can include a public network identifier (e.g., a public IMSI) that corresponds to public network 204. In some examples, the UE subscription policy can be configured by a network operator for private network 202. In some cases, the UE subscription policy can be configured based on user data obtained by UE 206.

At action 226, private AMF 208 can initiate secondary authentication between UE 206 and public DN-AAA 214. In some examples, AMF 208 can communicate with a private SMF (not illustrated) to initiate secondary authentication between UE 206 and public DN-AAA 214. At action 228, UE 206 can communicate with public DN-AAA 214 (e.g., using Extensible Authentication Protocol (EAP) messages). After successful secondary authentication between UE 206 and public DN-AAA 214, at action 230 the private network identifier for UE 206 (e.g., IMSI and/or MSISDN associated with private network 202) can be associated with the public network identifier for UE 206 (e.g., the private network ID is associated with public network 204 at the public DN-AAA 214). In some aspects, UE 206 can use secondary authentication with public DN-AAA 214 to provide consent and/or authorization for mapping and delivering messages to a different identity on a different network.

At action 232, the sequence 200 includes receiving an SMS message via public SMSF 218 that is directed to or associated with the public network identity corresponding to UE 206. For example, an SMS message can be received that is directed to a public MSISDN. In some aspects, the public MSISDN can be associated with a public network identity (e.g., a public IMSI) and a private network identity (e.g., a private IMSI). At action 234, public SMSF 218 can obtain and review an SMS subscription policy corresponding to UE 206. In some examples, the SMS subscription policy can include one or more preferences for delivery of SMS messages received via public network 204. In some aspects, delivery preferences can include a preference to deliver SMS messages via public network 204 only; delivery via private network 202 only; delivery via public network 204 and private network 202 (e.g., replicate SMS message on both networks); delivery via a preferred network (e.g., configured by a user); delivery via private network 202 when UE 206 is not associated with public network 204; and/or any other delivery configurations.

In some aspects, the delivery preferences in the UE subscription policy can include delivery of SMS messages via public network 204 and public SMSF 218 can perform action 236 to determine if UE 206 is available on public network 204. In some examples, public SMSF 218 can attempt to page UE 206 (e.g., via a public AMF 216) and receive an indication at action 238 that UE 206 is not available on public network 204.

At action 240, public SMSF 218 can obtain information relating to any private networks (e.g., private network 202) that are associated with UE 206 from public DN-AAA 214. In some aspects, public SMSF 218 can obtain one or more private identities that are associated with UE 206 from public DN-AAA 214. In some examples, public SMSF 218 can obtain information that identifies private network 202 such as realm information, domain information, routing information, IP address(es) (e.g., IP address of private SMSF 212), etc. In some examples, public SMSF 218 can identify private SMSF 212 based on a realm that is associated with a private network identity corresponding to UE 206.

Based on the UE subscription policy and the information obtained from public DN-AAA 214, at action 242 the public SMSF 218 can forward the SMS message directed to the public identifier associated with UE 206 to private SMSF 212 for delivery via private network 202. At action 244, private SMSF 212 can forward the message to private AMF 208 for delivery to UE 206. In some aspects, private SMSF 212 can extract a payload portion of the SMS message (e.g., user data) and forward the payload to private AMF 208. In some cases, private SMSF 212 can provide to private AMF 208 an indication that the SMS message was directed to the public identity associated with UE 206 on public network 204.

In some aspects, UE 206 may be in an idle state and private AMF 208 can perform action 246 and page UE 206 using the private identity associated with UE 206 on private network 202. In other aspects, UE 206 may be in a connected state (e.g., or enter a connected state after as part of the payload of a Downlink NAS transport message. In some cases, the message to UE 206 can include an indication that the SMS message was routed to UE 206 from public network 204 (e.g., message was directed towards public identity). In some examples, the message to UE 206 can include metadata that can be used to identify the network identity that was used as the destination address for the original SMS message received on public network 204.

At action 250, UE 206 can receive the SMS message with an indication that the SMS message was sent to the public identity (e.g., associated with public network 204) and delivered to UE 206 via private network 202. At action 252, private SMSF 212 can send a message to public SMSF 218 indicating that the SMS message was delivered successfully to UE 206. In some examples, private SMSF 212 can receive an indication of successful delivery from private AMF 208.

At action 254, a user can compose an SMS message using UE 206 that may be directed to a wireless device that is outside of private network 202. In some aspects, UE 206 can send the SMS message that is directed to a user identity associated with a device on public network 204 to private AMF 208. In some examples, the SMS message can be sent using an uplink NAS transport message that includes an SMS container. At action 256, private AMF 208 can forward the SMS message to private SMSF 212. At action 258, private SMSF 212 can send the SMS message to public SMSF 218 for delivery to a UE that is associated with public network 204. In some examples, the SMS message can be delivered with an indication that it originated from the public network identifier associated with UE 206 (e.g., the originating address of the SMS message can be public identity of UE 206). In some aspects, the SMS message can be delivered with an indication that it originated from the private network identifier associated with UE 206 (e.g., the originating address of the SMS message can be private identity of UE 206).

In some examples, UE 206 can become disconnected from private network 202. For instance, at action 260, private AMF 208 can detect that UE 206 is no longer connected with private network 202. At action 262, private AMF 208 can send a message to public DN-AAA 214 indicating that UE 206 is not connected or associated with private network 202 (e.g., via a private SMF such as SMF 152). At action 264, public DN-AAA can remove the private network identifier associated with UE 206. In some examples, SMS messages received on public network 204 after the private network identifier for UE 206 is removed from public DN-AAA will be delivered via public network 204.

FIG. 3 is a sequence diagram illustrating an example of a sequence 300 for performing inter-network messaging among private and public 5G wireless networks. The sequence 300 may be performed by a public network 302, a private network 304, and a UE 306. The public network 302 can include a public Application and Mobility Management Function (AMF) 308, a public Unified Data Management (UDM) 310 (e.g., authentication server), and a public Short Message Service Function (SMSF) 312. The private network 304 can include a private Data Network Authentication, Authorization, and Accounting (DN-AAA) server 314, a private AMF 316, and a private SMSF 318.

At action 320, UE 306 can perform 5G registration with public network 302 (e.g., a public mobile network operator). In some aspects, public network 302 can correspond to a public 5G/NR mobile network. In some cases, UE 306 can be associated with a network identifier that can be used to identify UE 306 on public network 302. In some examples, the network identifier can correspond to an International Mobile Subscriber Identity (IMSI) which can correspond to a Subscriber Identity Module (SIM) associated with UE 306. In some aspects, the network identifier can be associated with a mobile station international subscriber directory number (MSISDN), which can provide a mapping of a telephone number associated with UE 306 to the SIM.

At action 322, public AMF 308 can request a UE subscription policy associated with UE 306 from public UDM 310. At action 324, public UDM 310 can send the UE subscription policy associated with UE 306 to public AMF 308. In some examples, the UE subscription policy can include one or more messaging preferences associated with UE 306. For instance, the UE subscription policy can include a preference for sending and/or receiving SMS messages through private network 304. In some aspects, the UE subscription policy can include a private network identifier (e.g., a private IMSI) that corresponds to private network 304. In some examples, the UE subscription policy can be configured by a network operator for public network 302. In some cases, the UE subscription policy can be configured based on user data obtained by UE 306.

At action 326, public AMF 308 can initiate secondary authentication between UE 306 and private DN-AAA 314. In some examples, AMF 308 can communicate with a public SMF (not illustrated) to initiate secondary authentication between UE 306 and private DN-AAA 314. At action 328, UE 306 can communicate with private DN-AAA 314 (e.g., using Extensible Authentication Protocol (EAP) messages). After successful secondary authentication between UE 306 and private DN-AAA 314, at action 330 the public network identifier for UE 306 (e.g., network ID associated with public network 302) can be associated with the private network identifier for UE 306 (e.g., network ID associated with private network 304).

At action 332, the sequence 300 includes receiving an SMS message via private SMSF 318 that is directed to or associated with the private network identity corresponding to UE 306. For example, an SMS message can be received that is directed to a private MSISDN. In some aspects, the private MSISDN can be associated with a private network identity (e.g., a private IMSI) and a public network identity (e.g., a public IMSI). At action 334, private SMSF 318 can obtain and review an SMS subscription policy corresponding to UE 306. In some examples, the SMS subscription policy can include one or more preferences for delivery of SMS messages received via private network 304. In some aspects, delivery preferences can include a preference to deliver SMS messages via private network 304 only; delivery via public network 302 only; delivery via private network 304 and public network 302 (e.g., replicate SMS message on both networks); delivery via a preferred network (e.g., configured by a user); delivery via public network 302 when UE 306 is not associated with private network 304; and/or any other delivery configurations.

In some aspects, the delivery preferences in the UE subscription policy can include delivery of SMS messages via private network 304 and private SMSF 318 can perform action 336 to determine if UE 306 is available on private network 304. In some examples, private SMSF 318 can attempt to page UE 306 (e.g., using private AMF 316) and receive an indication at action 338 that UE 306 is not available on private network 304.

At action 340, private SMSF 318 can obtain information relating to any public networks (e.g., public network 302) that are associated with UE 306 from private DN-AAA 314. In some aspects, private SMSF 318 can obtain one or more public identities that are associated with UE 306 from private DN-AAA 314. In some examples, private SMSF 318 can obtain information that identifies public network 302 such as realm information, domain information, routing information, IP address(es) (e.g., IP address of public SMSF 312), etc.

Based on the UE subscription policy and the information obtained from private DN-AAA 314, at action 342 the private SMSF 318 can forward the SMS message directed to the private identifier associated with UE 306 to public SMSF 312 for delivery via public network 302. At action 344, public SMSF 312 can forward the message to public AMF 308 for delivery to UE 306. In some aspects, public SMSF 312 can extract a payload portion of the SMS message (e.g., user data) and forward the payload to public AMF 308. In some cases, public SMSF 312 can provide to public AMF 308 an indication that the SMS message was directed to the private identity associated with UE 306 on private network 304.

In some aspects, UE 306 may be in an idle state and public AMF 308 can perform action 345 and page UE 306 using a public identity associated with UE 306 on public network 302. In other aspects, UE 306 may be in a connected state (e.g., or enter a connected state after paging) and public AMF 308 can deliver the SMS message to UE 306. In some examples, an SMS message container can be delivered to UE 306 using a Non-Access Stratum (NAS) protocol. For example, the SMS message container can be included as part of the payload of a Downlink NAS transport message. In some cases, the message to UE 306 can include an indication that the SMS message was routed to UE 306 from private network 304 (e.g., message was directed towards private identity).

At action 350, UE 306 can receive the SMS message with an indication that the SMS message was sent to the private identity (e.g., associated with private network 304) and delivered to UE 306 via public network 302. At action 352, public SMSF 312 can send a message to private SMSF 318 indicating that the SMS message was delivered successfully to UE 306. In some examples, public SMSF 312 can receive an indication of successful delivery from public AMF 308.

At action 354, a user can compose an SMS message using UE 306 that may be directed to a wireless device that is outside of public network 302. In some aspects, UE 306 can send the SMS message that is directed to a user identity associated with a device on private network 304 to public AMF 308. In some examples, the SMS message can be sent using an uplink NAS transport message that includes an SMS container. At action 356, public AMF 308 can forward the SMS message to public SMS 312. At action 358, public SMSF 312 can send the SMS message to private SMSF 318 for delivery to a UE that is associated with private network 304. In some examples, the SMS message can be delivered with an indication that it originated from the private network identifier associated with UE 306 (e.g., the originating address of the SMS message can be the private identity of UE 306). In some aspects, the SMS message can be delivered with an indication that it originated from the public network identifier associated with UE 306 (e.g., the originating address of the SMS message can be public identity of UE 306).

In some examples, UE 306 can become disconnected from public network 302. For instance, at action 360, public AMF 308 can detect that UE 306 is no longer connected with public network 302. At action 362, public AMF 308 can send a message to private DN-AAA 314 (e.g., via a public SMF such as SMF 152) indicating that UE 306 is not connected or associated with public network 302. In some examples, the message to private DN-AAA 314 can correspond to a Remote Authentication Dial-In User Service (RADIUS) protocol message (e.g., Accounting Stop). At action 364, DN-AAA can remove the public network identifier associated with UE 306. In some examples, SMS messages received on private network 304 after the public network identifier for UE 306 is removed from private DN-AAA 314 will be delivered via private network 304.

FIG. 4 is a flowchart illustrating an example method 400 for performing inter-network messaging among public and private 5G wireless networks. At block 402, the method 400 can include receiving, by a first server on a public 5G mobile network, a first message directed to a first wireless device associated with a first network identity. In some aspects, the first server can correspond to a Short Message Service Function (SMSF) server, such as public SMSF 218. In some examples, the first message can correspond to a Short Message Service (SMS) message.

At block 404, the method 400 can include determining, by the first server based on the first network identity, that the first wireless device is associated with a second network identity, wherein the second network identity is used to identify the first wireless device on a private 5G mobile network (e.g., private network 202). In some examples, the first server can determine that the first wireless device is not accessible on the public 5G mobile network. For example, the first server can send a paging message to the first wireless device as described with respect to actions 236 and 238 to determine whether the first wireless device is accessible on the public 5G mobile network.

At block 406, the method 400 can include sending a copy of the first message to a second server on the private 5G mobile network for transmission to the first wireless device through the private 5G mobile network based on the second network identity. In some aspects, the first server can send the copy of the first message to an SMSF server on the private 5G mobile network (e.g., private SMSF 212). In some examples, the first server can obtain an address corresponding to the second server from a Data Network Authentication, Authorization, and Accounting (DN-AAA) server on the public 5G mobile network. In some cases, the copy of the first message can include an indication that the first message was directed to the first network identity (e.g., the network identity associated with the public 5G mobile network).

In some aspects, the first server can receive an indication that the copy of the first message was delivered to the first wireless device (e.g., via the private 5G mobile network). In some examples, the first server can receive, from the second server, a second message that is directed to a second wireless device, wherein the second message includes a sender identifier corresponding to the second network identity used to identify the first wireless device on the private 5G mobile network. In some examples, the first server can send a copy of the second message to the second wireless device, wherein the sender identifier in the copy of the second message corresponds to the first network identity.

FIG. 5 is a flowchart illustrating an example method 500 for performing inter-network messaging among public and private 5G wireless networks. At block 502, the method 500 can include obtaining a subscription policy associated with a wireless device having a first network identity corresponding to a first network, wherein the subscription policy includes at least one messaging preference associated with a second network identity corresponding to a second network. In some cases, the first network can correspond to a public 5G mobile network and the second network can correspond to a private 5G mobile network. In some examples, the subscription policy can be obtained by a private AMF (e.g., AMF 208) from a private UDM (e.g., UDM 210). In some aspects, the at least one messaging preference can be based on a user preference obtained from the wireless device.

At block 504, the method 500 can include initiating an authentication session between the wireless device and a server on the second network, wherein the authentication session associates the first network identity with the second network identity on the server. In some examples, the authentication session can include a secondary authentication between the wireless device and a Data Network Authentication, Authorization, and Accounting (DN-AAA) server on the second network.

In some aspects, the method 500 can include receiving a first message (e.g., an SMS message or the payload from an SMS message) directed to the wireless device having the first network identity and sending a copy of the first message to the wireless device, wherein the copy of the first message includes an indication that the first message was directed to the first network identity. For example, private AMF 208 can receive an SMS message that was directed to a public network identity associated with UE 206. Private AMF 208 can send a copy of the SMS message or the SMS message payload to UE 206. In some examples, the copy of the first message can be sent using a Non-Access Stratum (NAS) protocol. For instance, the payload of the SMS message can be included as part of a Downlink NAS transport message.

The disclosure now turns to FIGS. 6 and 7, which illustrate example network devices and computing devices, such as switches, routers, nodes, servers, client devices, orchestrators, and so forth.

FIG. 6 illustrates an example network device 600 suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, Radio Frequency (RF) interfaces, DOCSIS interfaces, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU (e.g., 604) to efficiently perform routing computations, network diagnostics, security functions, etc.

Although the system shown in FIG. 6 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

In some examples, the processes described herein (e.g., process 300, 400, and/or other processes described herein) may be performed by a computing device or apparatus. In one example, the process 300 can be performed by a computing device with the computing system 600 shown in FIG. 6. For instance, CCAP-Core 102 and/or RPD 104 can include a computer architecture similar to that of computing system 600 and can implement the operations of process 300.

FIG. 7 illustrates an example computing system 700 for implementing certain aspects of the present technology. In this example, the components of the system 700 are in electrical communication with each other using a connection 706, such as a bus. The system 700 includes a processing unit (CPU or processor) 704 and a connection 706 that couples various system components including a memory 720, such as read only memory (ROM) 718 and random access memory (RAM) 716, to the processor 704.

The system 700 can include a cache of high-speed memory connected directly with, in close proximity to, or integrated as part of the processor 704. The system 700 can copy data from the memory 720 and/or the storage device 708 to cache 702 for quick access by the processor 704. In this way, the cache can provide a performance boost that avoids processor 704 delays while waiting for data. These and other modules can control or be configured to control the processor 704 to perform various actions. Other memory 720 may be available for use as well. The memory 720 can include multiple different types of memory with different performance characteristics. The processor 704 can include any general purpose processor and a hardware or software service, such as service 1 710, service 2 712, and service 3 714 stored in storage device 708, configured to control the processor 704 as well as a special-purpose processor where software instructions are incorporated into the actual processor design. The processor 704 may be a completely self-contained computing system, containing multiple cores or processors, a bus, memory controller, cache, etc. A multi-core processor may be symmetric or asymmetric.

To enable user interaction with the computing system 700, an input device 722 can represent any number of input mechanisms, such as a microphone for speech, a touch-sensitive screen for gesture or graphical input, keyboard, mouse, motion input, speech and so forth. An output device 724 can also be one or more of a number of output mechanisms known to those of skill in the art. In some instances, multimodal systems can enable a user to provide multiple types of input to communicate with the computing system 700. The communications interface 726 can generally govern and manage the user input and system output. There is no restriction on operating on any particular hardware arrangement and therefore the basic features here may easily be substituted for improved hardware or firmware arrangements as they are developed.

Storage device 708 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 716, read only memory (ROM) 718, and hybrids thereof.

The storage device 708 can include services 710, 712, 714 for controlling the processor 704. Other hardware or software modules are contemplated. The storage device 708 can be connected to the connection 706. In one aspect, a hardware module that performs a particular function can include the software component stored in a computer-readable medium in connection with the necessary hardware components, such as the processor 704, connection 706, output device 724, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of messaging among wireless networks, comprising:
   receiving, by a first server on a public 5G mobile network, a first message directed to a first wireless device associated with a first network identity;
   determining, by the first server based on the first network identity, that the first wireless device is associated with a second network identity, wherein the second network identity is used to identify the first wireless device on a private 5G mobile network;
   determining a delivery preference associated with the first wireless device, wherein the delivery preference indicates whether the first message is to be delivered to the first wireless device via the first network identity of the first wireless device on the public 5G network, via the second network identify of the first wireless device on the private 5G network, or via the first network identity and the second network identity of the first wireless device on the public 5G network and the private 5G network; and
   transmitting the first message to the first wireless device based on the delivery preference, wherein when the delivery preference indicates that the first message to be delivered to the first wireless device via the second network identity, the transmitting includes sending a copy of the first message to a second server on the private 5G mobile network for transmission to the first wireless device through the private 5G mobile network.

2. The method of claim 1, wherein the first server comprises a Short Message Service Function (SMSF) server.

3. The method of claim 1, further comprising:
   obtaining, from a Data Network Authentication, Authorization, and Accounting (DN-AAA) server on the public 5G mobile network, an address corresponding to the second server.

4. The method of claim 1, further comprising:
   determining, by the first server, that the first wireless device is not accessible on the public 5G mobile network.

5. The method of claim 1, further comprising:
   receiving, from the second server, an indication that the copy of the first message was delivered to the first wireless device.

6. The method of claim 1, wherein the first message comprises a Short Messaging Service (SMS) message.

7. The method of claim 1, wherein the copy of the first message includes an indication that the first message was directed to the first network identity.

8. The method of claim 1, further comprising:
   receiving, from the second server, a second message directed to a second wireless device, wherein the second message includes a sender identifier corresponding to the second network identity used to identify the first wireless device on the private 5G mobile network; and
   sending a copy of the second message to the second wireless device, wherein the sender identifier in the copy of the second message corresponds to the first network identity.

9. A non-transitory computer-readable storage medium having stored thereon instructions which, when executed by one or more processors, cause the one or more processors to:
   receive, by a first server on a public 5G mobile network, a first message directed to a first wireless device associated with a first network identity;
   determine, by the first server based on the first network identity, that the first wireless device is associated with a second network identity, wherein the second network identity is used to identify the first wireless device on a private 5G mobile network;
   determine a delivery preference associated with the first wireless device, wherein the delivery preference indicates whether the first message is to be delivered to the first wireless device via the first network identity of the first wireless device on the public 5G network, via the second network identify of the first wireless device on the private 5G network, or via the first network identity and the second network identity of the first wireless device on the public 5G network and the private 5G network; and
   transmit the first message to the first wireless device based on the delivery preference, wherein when the delivery preference indicates that the first message to be delivered to the first wireless device via the second network identity, transmission of the first message includes sending a copy of the first message to a second server on the private 5G mobile network for transmission to the first wireless device through the private 5G mobile network.

10. The non-transitory computer-readable storage medium of claim 9, comprising instructions which, when executed by one or more processors, cause the one or more processors to:
   obtain, from a Data Network Authentication, Authorization, and Accounting (DN-AAA) server on the public 5G mobile network, an address corresponding to the second server.

11. The non-transitory computer-readable storage medium of claim 9, comprising instructions which, when executed by one or more processors, cause the one or more processors to:
- determine, by the first server, that the first wireless device is not accessible on the public 5G mobile network.

12. The non-transitory computer-readable storage medium of claim 9, comprising instructions which, when executed by one or more processors, cause the one or more processors to:
- receive, from the second server, an indication that the copy of the first message was delivered to the first wireless device.

13. The non-transitory computer-readable storage medium of claim 9, wherein the copy of the first message includes an indication that the first message was directed to the first network identity.

14. The non-transitory computer-readable storage medium of claim 9, comprising instructions which, when executed by one or more processors, cause the one or more processors to:
- receive, from the second server, a second message directed to a second wireless device, wherein the second message includes a sender identifier corresponding to the second network identity used to identify the first wireless device on the private 5G mobile network; and
- send a copy of the second message to the second wireless device, wherein the sender identifier in the copy of the second message corresponds to the first network identity.

* * * * *